US012700768B2

(12) United States Patent
Zhang

(10) Patent No.: US 12,700,768 B2
(45) Date of Patent: Aug. 4, 2026

(54) MOTORS WITH BUILT-IN OPTICAL FIBER COMMUNICATION

(71) Applicant: ANHUI LANXUAN PHOTOELECTRIC TECHNOLOGY CO., LTD., Hefei (CN)

(72) Inventor: Lujuan Zhang, Hefei (CN)

(73) Assignee: ANHUI LANXUAN PHOTOELECTRIC TECHNOLOGY CO., LTD., Hefei (CN)

( * ) Notice: Subject to any disclaimer, the term of this patent is extended or adjusted under 35 U.S.C. 154(b) by 446 days.

(21) Appl. No.: 18/477,518

(22) Filed: Sep. 28, 2023

(65) Prior Publication Data

US 2024/0030778 A1     Jan. 25, 2024

Related U.S. Application Data

(63) Continuation-in-part of application No. PCT/CN2022/095552, filed on May 27, 2022.

(30) Foreign Application Priority Data

Feb. 16, 2022    (CN) .......................... 202210142559.2

(51) Int. Cl.
G02B 6/26        (2006.01)
G02B 6/36        (2006.01)
H02K 5/22        (2006.01)

(52) U.S. Cl.
CPC ........... H02K 5/225 (2013.01); G02B 6/3604 (2013.01)

(58) Field of Classification Search
CPC .... H02K 5/225; H02K 11/0094; H02K 7/003; G02B 6/3604; G02B 6/26
See application file for complete search history.

(56) References Cited

U.S. PATENT DOCUMENTS

| | | | |
|---|---|---|---|
| 5,039,193 A | 8/1991 | Snow et al. | |
| 6,353,693 B1 * | 3/2002 | Kano ..................... | H05K 13/04 398/112 |
| 7,792,400 B1 * | 9/2010 | Zhang .................. | G02B 6/3604 385/25 |
| 8,355,607 B2 * | 1/2013 | Zhang .................. | G02B 6/3604 475/338 |

(Continued)

FOREIGN PATENT DOCUMENTS

| | | |
|---|---|---|
| CN | 104793296 A | 7/2015 |
| CN | 205353410 U | 6/2016 |

(Continued)

OTHER PUBLICATIONS

International Search Report in PCT/CN2022/095552 mailed on Nov. 9, 2022, 7 pages.

(Continued)

*Primary Examiner* — Jennifer Doan
(74) *Attorney, Agent, or Firm* — PORUS IP LLC

(57) ABSTRACT

Embodiments of the present disclosure provide a motor with built-in optical fiber communication, including a slip ring section and a driving section, wherein the driving section has a rotationally mounted driving shaft, the slip ring section has a stator unit and a rotor unit, and the driving shaft and the rotor unit are arranged along a centerline of the driving shaft and are fixedly connected.

12 Claims, 3 Drawing Sheets

(56)          References Cited

U.S. PATENT DOCUMENTS

2002/0190599 A1 *  12/2002  Akabane ................. H02K 5/24
                                                          310/232

FOREIGN PATENT DOCUMENTS

| | | | |
|---|---|---|---|
| CN | 111313620 | A | 6/2020 |
| CN | 111736269 | A | 10/2020 |
| CN | 212229240 | U | 12/2020 |
| CN | 212301973 | U | 1/2021 |
| CN | 114499031 | A | 5/2022 |
| CN | 216873003 | U | 7/2022 |
| CN | 115712173 | A | 2/2023 |

OTHER PUBLICATIONS

Written Opinion in PCT/CN2022/095552 mailed on Nov. 9, 2022, 9 pages.

* cited by examiner

411

412

41

MOTORS WITH BUILT-IN OPTICAL FIBER COMMUNICATION

CROSS-REFERENCE TO RELATED APPLICATIONS

This application is a Continuation-in-part of International Application No. PCT/CN2022/095552, filed on May 27, 2022, which claims priority to Chinese Patent Application No. 202210142559.2, filed on Feb. 16, 2022, the entire contents of each of which are hereby incorporated by reference.

TECHNICAL FIELD

The present disclosure relates to the field of communication components, and in particular to a motor with built-in optical fiber communication.

BACKGROUND

A motor with built-in optical fiber communication (or optical slip ring) is a component used for rotary connections and signal transmission, commonly found in military, medical, aerospace, and marine industries. Currently, the conventional optical slip ring typically consists of a slip ring section and a driving section. The slip ring section includes a stator unit and a rotor unit, while the driving section is positioned alongside the slip ring section. The centerlines of both sections are arranged parallel to each other. The transmission output end of the drive section is connected to the rotor unit through a transmission component, such as a belt, resulting in significant noise, vibration, and heat generation during high-speed operation. These limitations restrict the motor's application areas and lifespan while also increasing the overall production cost of the component.

Therefore, it is necessary to provide a motor with built-in optical fiber communication to reduce noise and vibration during high-speed operation, reduce production costs, expand the application fields of the motor, and improve the service life of the motor.

SUMMARY

One of the embodiments of the present disclosure provides a motor with built-in optical fiber communication, including a slip ring section and a driving section, wherein the driving section has a rotationally mounted driving shaft, the slip ring section has a stator unit and a rotor unit, and the driving shaft and the rotor unit are arranged along a centerline of the driving shaft and are fixedly connected.

In some embodiments, the driving shaft has a channel passing through a shaft body. The rotor unit includes an input collimator. The channel is configured to accommodate an input fiber bundle connected to the input collimator, and the driving shaft and the input collimator are fixedly connected through a first connecting component.

In some embodiments, the first connecting component includes a first tube body, one end of the first tube body is fixedly connected to one end of the driving shaft, and the input collimator is mounted at another end of the first tube body.

In some embodiments, the another end of the first tube body is provided with a first adjustment component configured to adjust an attitude of a centerline of the input collimator.

In some embodiments, the stator unit includes an output collimator, the driving section further includes a housing, and the output collimator is fixedly mounted on the housing through a second connecting component.

In some embodiments, the second connecting component includes a second tube body, the second tube body is sleeved on the first tube body, one end of the second tube body is fixedly connected to the housing, and the output collimator is mounted within another end of the second tube body.

In some embodiments, the another end of the second tube body is provided with a second adjustment component configured to adjust an attitude of a centerline of the output collimator.

In some embodiments, the driving section is composed of a hollow motor.

In some embodiments, the first adjustment component includes first adjustment threaded holes. The first adjustment threaded holes are provided on a tube wall at the another end of the first tube body and are spaced apart along a circumference of the first tube body. The first adjustment threaded holes are provided with first adjustment screws configured to adjust the attitude of the centerline of the input collimator and fix the input collimator.

In some embodiments, the second adjustment component includes second adjustment threaded holes. The second adjustment threaded holes are provided on a tube wall at the another end of the second tube body and are spaced apart along a circumference of the second tube body. The second adjustment threaded holes are provided with second adjustment screws configured to adjust the attitude of the centerline of the output collimator and fix the output collimator.

In some embodiments, a mounting hole is provided on a tube wall at the one end of the first tube body, and a mounting screw is provided in the mounting hole. The one end of the driving shaft is inserted into the first tube body, and the one end of the driving shaft and the first tube body are fixedly connected through the mounting hole and the mounting screw.

In some embodiments, the second tube body is a tapered tube, including a first tube segment and a second tube segment. A diameter of the first tube segment is greater than a diameter of the second tube segment. The first tube segment is closer to the driving section than the second tube segment. The second adjustment threaded hole is provided on a tube wall of the second tube segment. The first tube body is located within the first tube segment, and an inner diameter of the first tube segment is greater than an outer diameter of the first tube body. An outer end of the first tube segment is provided with a flange for fixed connection with the housing.

In some embodiments, another end of the driving shaft is provided with a signal access connector.

In some embodiments, the input collimator includes an input tube body and an input collimator main body located within the input tube body. The output collimator includes an output tube body and an output collimator main body located within the output tube body. The input tube body and the output tube body are metallic tube bodies. The first adjustment screw and the second adjustment screw respectively abut and adjust to fix the input tube body and the output tube body. An inner diameter of the first tube body is greater than an outer diameter of the input tube body, and an inner diameter of the second tube body is greater than an outer diameter of the output tube body.

In some embodiments, the input fiber bundle is fixed within the channel through gluing, the input collimator main body is fixedly connected to the input tube body through gluing, and the output collimator main body is fixedly connected to the output tube body through gluing.

BRIEF DESCRIPTION OF THE DRAWINGS

The present disclosure will be further illustrated by way of exemplary embodiments, which will be described in detail through the accompanying drawings. These embodiments are not limiting, and in these embodiments the same numbering indicates the same structure, wherein.

DETAILED DESCRIPTION

Figure 1:
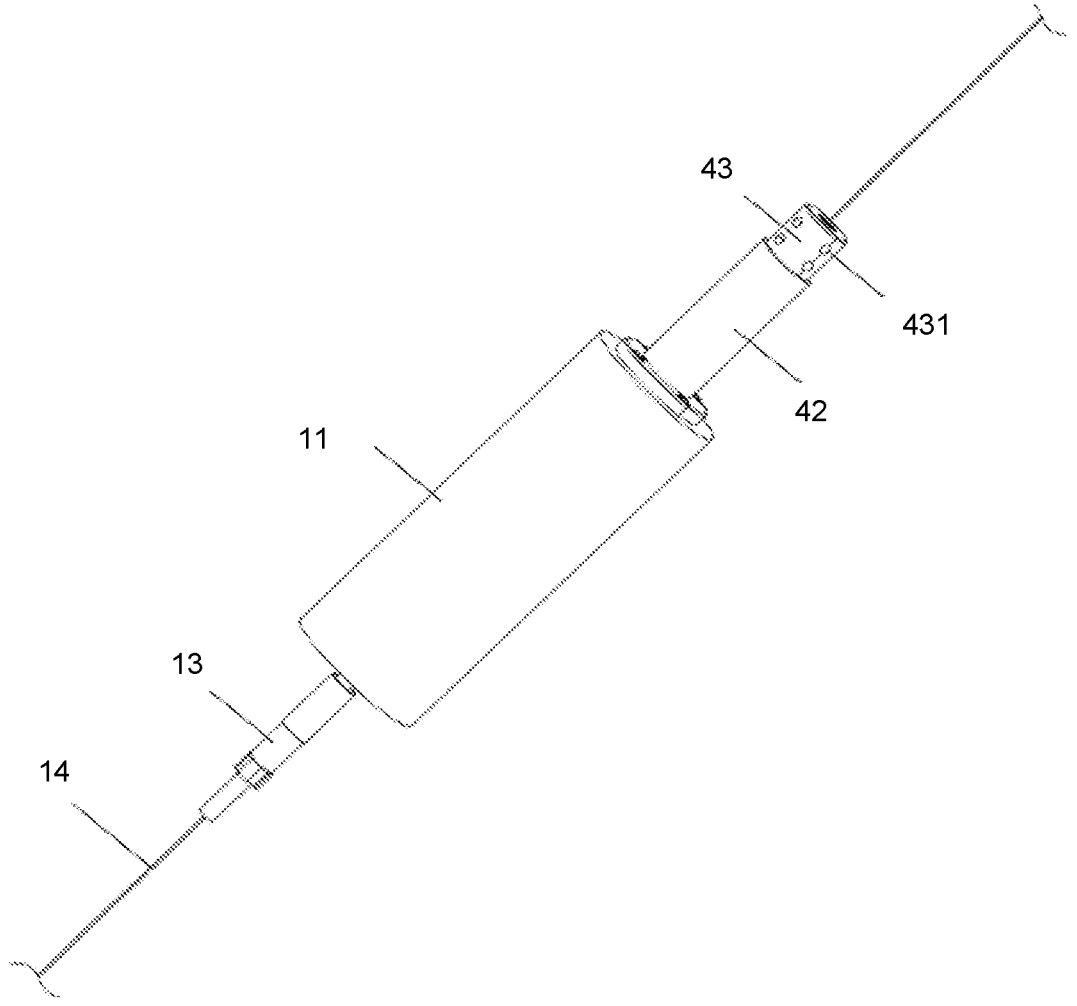
FIG. 1 is a schematic diagram of a structure of a motor with built-in optical fiber communication according to some embodiments of the present disclosure.

In order to more clearly illustrate the technical solutions of the embodiments of the present disclosure, the accompanying drawings to be used in the description of the embodiments will be briefly described below. Obviously, the accompanying drawings in the following description are only some examples or embodiments of the present disclosure, and that the present disclosure may be applied to other similar scenarios in accordance with these drawings without creative labor for those of ordinary skill in the art. Unless obviously obtained from the context or the context illustrates otherwise, the same numeral in the drawings refers to the same structure or operation.

It should be understood that "system", "device", "unit" and/or "module" as used herein is a way to distinguish between different components, elements, parts, sections, or assemblies at different levels. However, these words may be replaced by other expressions if other words accomplish the same purpose.

As indicated in the present disclosure and in the claims, unless the context clearly suggests an exception, the words "one," "a," "an," and/or "the" do not refer specifically to the singular but may also include the plural. In general, the terms "including" and "comprising" suggest only the inclusion of clearly identified steps and elements, which do not constitute an exclusive list, and the method or device may also include other steps or elements.

Figure 2:
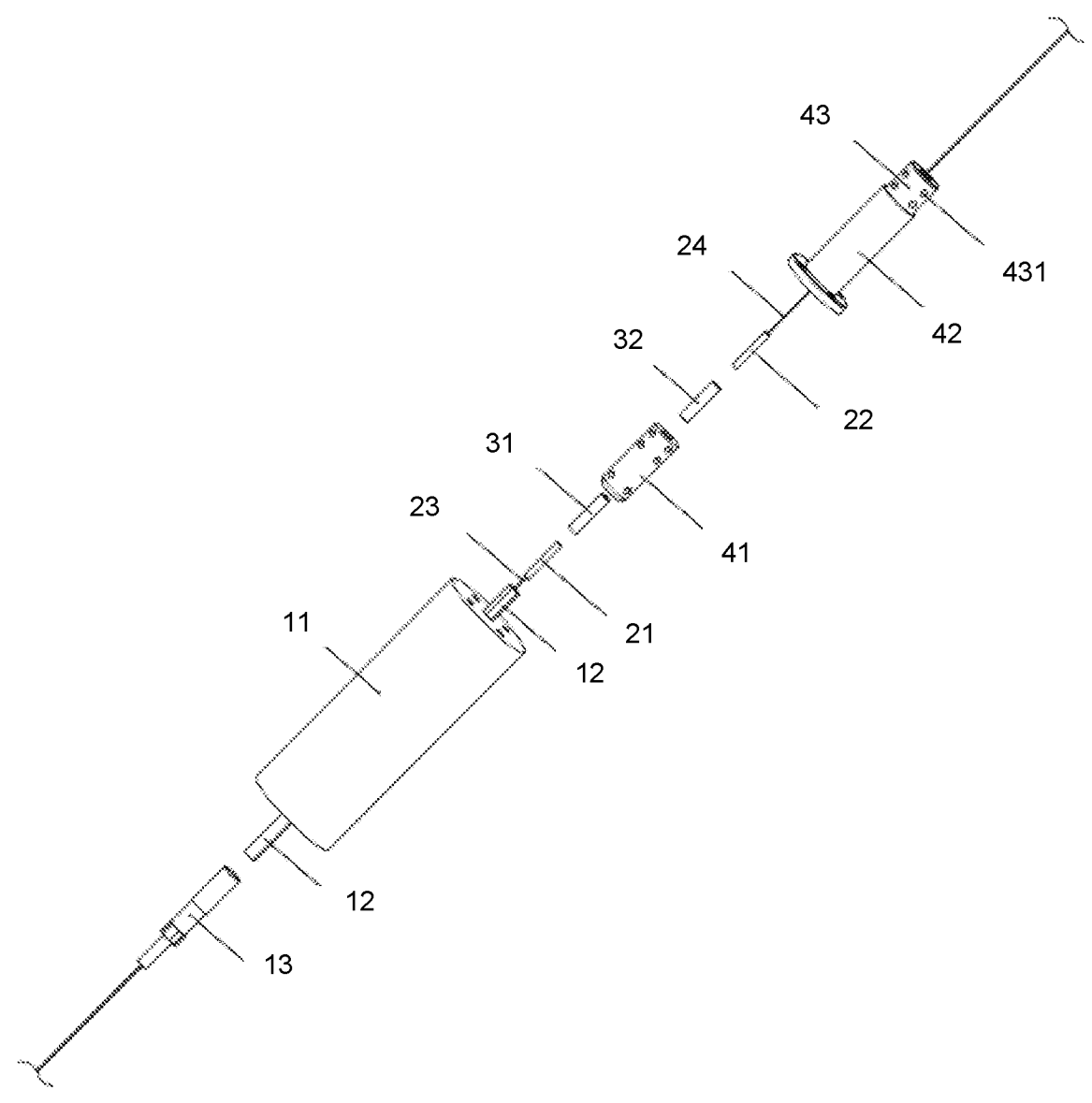
FIG. 2 is an exploded diagram of the motor with built-in optical fiber communication according to some embodiments of the present disclosure.

FIG. 1 is a schematic diagram of a structure of a motor with built-in optical fiber communication according to some embodiments of the present disclosure, and FIG. 2 is an exploded diagram of the motor with built-in optical fiber communication according to some embodiments of the present disclosure.

As shown in FIGS. 1-2, some embodiments of the present disclosure provide a motor with built-in optical fiber communication, including a slip ring section and a driving section, wherein the driving section has a rotationally mounted driving shaft 12, the slip ring section has a stator unit and a rotor unit, and the driving shaft 12 and the rotor unit are arranged along a centerline of the driving shaft 12 and are fixedly connected.

The driving section refers to a component for driving the rotation of the rotor unit. In some embodiments, the driving section may include a motor and the driving shaft 12. The driving shaft 12 is fixedly connected to the rotor unit, and when the motor operates, the driving shaft 12 drives the rotor unit to rotate. In some embodiments, the fixed connection may include a removable connection and a non-removable connection. Exemplarily, the removable connection includes a snap connection, a threaded connection, etc. The non-removable connection includes a welded connection, a riveted connection, etc.

The driving shaft 12 refers to an output shaft of the motor's output end. In some embodiments, the driving shaft 12 and the rotor unit are arranged along a centerline of the driving shaft and are fixedly connected. That is, a centerline of the rotor unit is collinear with the centerline of the driving shaft 12 (i.e., the rotor unit is coaxial with the driving shaft), and the rotor unit is fixedly connected to one end of the driving shaft 12.

In some embodiments, the driving section may be composed of a hollow motor 11. The hollow motor refers to a motor with a hollow structure (e.g., a hollow shaft) in which the hollow structure is available for an input fiber bundle 22 to pass through an interior of the hollow motor 11. The specifics of the input fiber bundle 22 may be found in the relevant descriptions that follow.

In some embodiments, the driving section further includes a housing. The housing may be configured to house and mount the slip ring section. In some embodiments, the slip ring section may be provided inside the housing and the stator unit may be fixedly connected to the housing.

The slip ring section refers to a component that collimates light. In some embodiments, the slip ring section may include the stator unit and the rotor unit.

The stator unit refers to a component that is stationary with respect to the housing. In some embodiments, the stator unit is provided on a side of the rotor unit away from the motor.

The rotor unit refers to a component that rotates relative to the housing but is stationary relative to the driving shaft 12. In some embodiments, the rotor unit may be fixedly connected to the driving shaft 12 and rotate under an action of the driving shaft 12.

More about the stator unit and rotor unit may be found in the relevant descriptions in other parts of the present disclosure.

In some embodiments of the present disclosure, by connecting the driving shaft and the rotor unit in a paralleling fixed connection, a transmission structure between the driving shaft and the rotor unit is minimized, which not only saves production costs and reduces operational noise, but also enhances the motor's service life and broadens the motor's application scope.

In some embodiments, the driving shaft 12 has a channel passing through a shaft body, and the rotor unit includes an input collimator. The channel is configured to accommodate the input fiber bundle 22 connected to the input collimator, and the driving shaft and the input collimator are fixedly connected through a first connecting component.

The channel refers to a space provided inside the driving shaft 12 and oriented in an axial direction of the driving shaft 12. In some embodiments, the input fiber bundle 22 may be connected to the input collimator through the channel. In some embodiments, the driving shaft 12 may extend through the motor along an axial direction of the motor, such that both ends of the channel are in communication with an external space of the motor.

It should be noted that a dimension (e.g., a diameter) of the channel may be determined based on an actual situation. For example, the dimension of the channel may be determined based on at least one of a dimension of the hollow motor 11 or a dimension of the driving shaft 12.

The input collimator refers to an optical component configured to collimate and introduce light into an output collimator. In some embodiments, since the driving shaft 12 and the rotor unit are fixedly connected, a rotation of the driving shaft 12 causes the input collimator to rotate together.

In some embodiments, the input collimator includes an input tube body 31 and an input collimator body 21 provided within the input tube body 31.

The input tube body 31 refers to a tubular structure for accommodating and fixing the input collimator body 21. In some embodiments, a dimension of the input tube body 31 may be determined based on an actual situation. For example, the dimension of the input tube body 31 may be determined based on a dimension of the input collimator body 21.

In some embodiments, a material of the input tube body 31 is not limited. For example, the input tube body 31 may be a metal tube body, a plastic tube body, etc.

The input collimator body 21 refers to a core component of the input collimator. In some embodiments, the input collimator body 21 is fixedly connected to the input tube body 31 through gluing, such that the input collimator body 21 is fixed within the input tube body 31 to meet a high-speed rotation requirement of the motor. In some embodiments, the input collimator body 21 and the input tube body 31 may also be fixedly connected by other means, for example, welding, fastener connection, etc.

The input fiber bundle 22 may be configured to perform signal transmission. In some embodiments, the input fiber bundle 22 may be connected to the input collimator for transmitting light to the input collimator. In some embodiments, an end of the input fiber bundle 22 may be aligned with an end of the input collimator proximate to the output collimator, such that light may be introduced accurately into the output collimator after passing through the input collimator. In some embodiments, a material of the input fiber bundle 22 is not limited. The input fiber bundle 22 may be an optical fiber or other fiber bundles that perform signal transmission. In some embodiments, a length of the input fiber bundle 22 may match a length of the driving shaft 12.

In some embodiments, the input fiber bundle 22 is fixed in the channel through gluing, and when the motor operates and the driving shaft 12 rotates, the input fiber bundle 22 rotates together. In some embodiments, the input fiber bundle 22 and the channel may also be fixedly connected by other means, for example, through a snap connection, etc.

The first connecting component refers to a component for fixedly connecting the input collimator to the driving shaft 12. In some embodiments, the first connecting component may be designed in a variety of configurations to achieve a fixed connection between the input collimator and the driving shaft 12. For example, the first connecting component may include a threaded connecting structure, a snap connecting structure, etc.

In some embodiments, the first connecting component includes a first tube body 41, one end of the first tube body 41 is fixedly connected to one end of the driving shaft 12, and the input collimator is mounted at another end of the first tube body 41.

The first tube body 41 refers to a tubular structure for fixedly connecting the input collimator to the driving shaft 12. In some embodiments, a structural shape of the first tube body 41 is not limited. For example, the first tube body 41 may be a straight tube body, a stepped tube body (i.e., a tapered tube), or in other shapes.

In some embodiments, an inner diameter of the first tube body 41 is greater than an outer diameter of the input tube body 31, such that the first tube body 41 may be socketed to the input tube body 31 and the input tube body 31 may be attitude adjusted in the first tube body 41. In some embodiments, a dimension of the first tube body 41 may be determined based on a dimension of the input tube body 31.

In some embodiments, another end of the first tube body 41 is provided with a first adjustment component configured to adjust an attitude of a centerline of the input collimator. The another end of the first tube body 41 refers to an end of the first tube body 41 away from the motor.

The first adjustment component refers to a component for adjusting the attitude of the centerline of the input collimator. The attitude of the centerline of the input collimator refers to a locational state of the centerline of the input collimator.

In some embodiments, the first adjustment component may include a variety of structures. For example, the first adjustment component may include a spring structure, based on which an attitude adjustment of the centerline of the input collimator is achieved.

Figure 3:
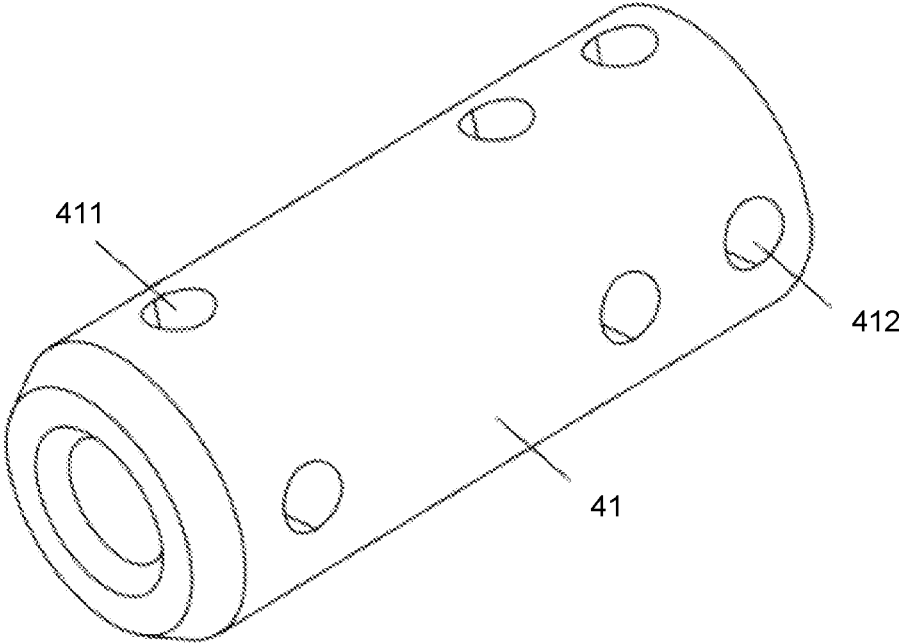
FIG. 3 is a schematic diagram of a structure of a first tube body according to some embodiments of the present disclosure.

FIG. 3 is a schematic diagram of a structure of a first tube body according to some embodiments of the present disclosure.

In some embodiments, as shown in FIG. 3, a first adjustment component includes first adjustment threaded holes 412. The first adjustment threaded holes 412 are provided on a tube wall at another end of the first tube body 41 and are spaced apart along a circumference of the first tube body 41, and the first adjustment threaded holes 412 are provided with first adjustment screws configured to adjust an attitude of a centerline of an input collimator and fix the input collimator.

The first adjustment threaded hole 412 refers to a hole provided on the tube wall of the another end of the first tube body 41 for mounting the first adjustment screw.

In some embodiments, a count of the first adjustment threaded holes 412 is at least four, and the at least four first adjustment threaded holes 412 are provided on the tube wall at the another end of the first tube body 41 and are spaced apart along the circumference of the first tube body 41. For example, the count of the first adjustment threaded holes 412 is five, the five first adjustment threaded holes 412 may be spaced aprt at equal intervals along the circumference of the first tube body 41. As another example, the count of the first adjustment threaded holes 412 is eight, the eight first adjustment threaded holes 412 may be divided into four groups, i.e., each group includes two first adjustment threaded holes 412 spaced apart along an axial direction of the first tube body 41, and the four groups of the first adjustment threaded holes 412 may be spaced apart at equal intervals along the circumference of the first tube body 41.

It is to be noted that the count of the first adjustment threaded holes 412, and the specific setting manner is not limited, and may be determined based on an actual requirement. For example, the count of first adjustment threaded holes 412 may be determined based on a dimension of the first tube body 41.

The first adjustment screw refers to a screw provided in the first adjustment threaded hole 412 for adjusting the attitude of the centerline of the input collimator and fixing the input collimator.

In some embodiments, the first adjustment screw is provided in correspondence with the first adjustment threaded hole 412, i.e., one first adjustment screw is provided in correspondence with each first adjustment threaded hole 412. Understandably, a count of the first adjustment screws is the same as the count of the first adjustment threaded holes 412.

In some embodiments, the first adjustment threaded holes 412 may also be provided at other arbitrary feasible locations along the circumference of the first tube body 41, for example, at a middle of the first tube body 41.

In some embodiments, the first adjustment screw may adjust the attitude of the centerline of the input collimator and fix the input collimator by abutting and adjusting to fix the input tube body 31. In some embodiments, by turning the first adjustment screw, a length of the first adjustment screw extending into the first adjustment threaded hole 412 may be adjusted, such that an end of the first adjustment screw abuts against the input tube body 31 of the input collimator, thereby enabling the adjustment of the attitude of the centerline of the input collimator and fixing the input collimator. Exemplarily, when the attitude of the centerline of the input collimator deviates to the right, the first adjustment screw on the right side may be adjusted accordingly to bring the attitude of the centerline of the input collimator back to normal.

In some embodiments of the present disclosure, by providing the first adjustment threaded holes and the first adjustment screws at intervals along the circumference of the first tube body, and fixing the input collimator by abutting and adjusting to fix the input tube body 31, reliable adjustment of the attitude of the centerline of the input collimator as well as fixation of the input collimator can be achieved effectively and conveniently.

As shown in FIG. 3, a mounting hole 411 is provided on a tube wall at the one end of the first tube body 41, and a mounting screw is provided in the mounting hole 411. One end of the driving shaft 12 is inserted into the first tube body 41, and the one end of the driving shaft and the first tube body are fixedly connected through the mounting hole 411 and the mounting screw.

The mounting hole and the mounting screw are fasteners that fix the first tube body 41. In some embodiments, the mounting hole 411 may be a threaded hole, circumferentially spaced apart on the tube wall of the first tube body 411 near an end of the motor, and the mounting screw and the mounting hole 411 cooperate with each other to realize a fixed connection between the driving shaft 12 and the first tube body 41.

It is noted that the mounting screw and the mounting hole 411 are provided in correspondence, and a count of the mounting holes 411 may be one or more. For example, the count of the mounting holes 411 may be two, three, four, etc. Exemplarily, the count of the mounting holes 411 is four, and the four mounting holes 411 are spaced apart along the circumference of the first tube body 41.

In some embodiments, turning the mounting screw may correspondingly adjust a length of an end of the mounting screw extending into the first tube body 41, such that the mounting screw abuts against the driving shaft 12 inserted into the first tube body 41 until the driving shaft 12 is tightened, thereby realizing the fixed connection between the first tube body 41 and the driving shaft 12.

In some embodiments of the present disclosure, by providing the mounting hole and the mounting screw on the tube wall of the first tube body, the first tube body and the driving shaft can be effectively fixed and mounted, such that the reliability and stability of the connection between the first tube body and the driving shaft can be ensured.

In some embodiments, a stator unit includes an output collimator, and a driving section further includes a housing.

The output collimator is fixedly mounted to the housing through a second connecting component.

The output collimator refers to an optical component for emitting collimated processed light (i.e., a collimated beam) into an output fiber bundle 24.

The output fiber bundle 24 refers to a fiber bundle that performs signal transmission. In some embodiments, the output fiber bundle 24 may be connected to the output collimator for transmitting the collimated beam emitted by the output collimator.

In some embodiments, the output collimator includes an output tube body 32 and an output collimator main body 23 located within the output tube body 32.

The output tube body 32 refers to a tubular structure for accommodating and fixing the output collimator main body 23. In some embodiments, a dimension of the output tube body 32 may be determined based on an actual situation. For example, the dimension of the output tube body 32 may be determined based on a dimension of the output collimator main body 23.

In some embodiments, a material of the output tube body 32 is not limited. For example, the output tube body 32 may be a metal tube body, a plastic tube body, etc.

The output collimator main body 23 refers to a core component of the output collimator. In some embodiments, the output collimator main body 23 is fixedly connected to the output tube body 32 through gluing to fix the output collimator main body 23 within the output tube body 32, so as to meet the high-speed rotation requirement of the motor. In some embodiments, the output collimator main body 23 may also be fixedly connected to the output tube body 32 by any other feasible means. For example, the output collimator main body 23 may be fixedly connected to the output tube body 32 through a snap connection, etc.

The second connecting component refers to a component for fixedly mounting the output collimator on the housing of the driving section.

In some embodiments, the connecting component may be designed in a variety of structures for fixedly mounting the output collimator on the housing of the driving section. For example, the second connecting component may include a threaded connecting structure, a snap connecting structure, etc.

In some embodiments, the second connecting component includes a second tube body 42, the second tube body 42 being sleeved on the first tube body 41. One end of the second tube body 42 is fixedly connected to the housing, and the output collimator is mounted within another end of the second tube body 42.

The second tube body 42 refers to a tubular structure for mounting the output collimator on the housing of the driving section. In some embodiments, a structural shape of the second tube body 42 is not limited. For example, the second tube body 42 may be a straight tube body, a stepped tube body (i.e., a tapered tube), etc.

In some embodiments, an inner diameter of the second tube body 42 is greater than an outer diameter of the output tube body 32 to facilitate fixed mounting of the output collimator within the another end of the second tube body 42.

In some embodiments, the second tube body 42 may be socketed to the first tube body 41, i.e., the inner diameter of the second tube body 42 is greater than the outer diameter of the first tube body 41. In some embodiments, a dimension of the second tube body 42 may be determined based on a dimension of the first tube body 41 and a dimension of the output tube body 31.

In some embodiments of the present disclosure, the second connecting component is designed as the second tube body capable of being socketed to the first tube body, and the one end of the second tube body is fixedly connected to the housing of the driving section, and the output collimator is mounted within the another end of the second tube body. This design not only realizes mounting the output collimator on the housing of the driving section to satisfy the need for high-speed rotation of the motor, but also saves a structural space of the motor.

In some embodiments, the another end of the second tube body 42 is provided with a second adjustment component for adjusting an attitude of a centerline of the output collimator.

The second adjustment component refers to a component for adjusting the attitude of the centerline of the output collimator. The attitude of the centerline of the output collimator refers to a locational state of the centerline of the output collimator.

In some embodiments, the second adjustment component may include a variety of structures. For example, the second adjustment component may include a spring structure, based on which an attitude adjustment to the centerline of the output collimator is achieved.

As shown in FIGS. 1-2, the second adjustment component includes second adjustment threaded holes 431. The second adjustment threaded holes 431 are provided on a tube wall of the another end of the second tube body 42 and are spaced apart along a circumference of the second tube body 42, and the second adjustment threaded holes 431 are provided with second adjustment screws configured to adjust the attitude of the centerline of the output collimator and fix the output collimator.

The second adjustment threaded hole 431 refers to a hole provided on the tube wall of the another end of the second tube body 42 for mounting the second adjustment screw.

In some embodiments, a count of the second adjustment threaded holes 431 is at least four. The at least four second adjustment threaded holes 431 are provided on the tube wall of the another end of the second tube body 42 and are spaced apart along the circumference of the second tube body 42. For example, the count of the second adjustment threaded holes 431 is five, and the five second adjustment threaded holes 431 may be spaced aprt at equal intervals along the circumference of the second tube body 42. As another example, the count of the second adjustment threaded holes 431 is eight, and the eight second adjustment threaded holes 431 may be divided into four groups, i.e., each group includes two second adjustment threaded holes 431 spaced apart along an axial direction of the second tube body 42, and the four groups of the second adjustment threaded holes 431 may be spaced apart at equal intervals along the circumference of the second tube body 42.

It is to be noted that the count of the second adjustment threaded holes 431 and the specific setting manner of the second adjustment threaded holes 431 are not limited, and may be determined based on an actual need. For example, the count of the second adjustment threaded holes 431 may be determined based on the dimension of the second tube body 42.

The second adjustment screw refers to a screw provided in the second adjustment threaded hole 431 for adjusting the attitude of the centerline of the output collimator and fixing the output collimator.

In some embodiments, the second adjustment screws are provided in correspondence with the second adjustment threaded holes 431, i.e., each second adjustment screw is provided in correspondence with each second adjustment threaded hole 431. Understandably, a count of the second adjustment screws is the same as the count of the second adjustment threaded holes 431.

In some embodiments, the second adjustment screw may adjust the attitude of the centerline of the output collimator and fix the output collimator by abutting and adjusting to fix the output tube body 32. Exemplarily, when the attitude of the centerline of the output collimator deviates to the left, the first adjustment screw on the left side may be adjusted accordingly to bring the attitude of the centerline of the output collimator back to normal.

In some embodiments of the present disclosure, by providing the second adjustment threaded holes and the second adjustment screws at intervals along the circumference of the second tube body, and fixing the output collimator by abutting and adjusting to fix the output tube body 32, reliable adjustment of the attitude of the centerline of the output collimator as well as fixing of the output collimator can be achieved effectively and conveniently.

In some embodiments, the second tube body 42 is a tapered tube, including a first tube segment and a second tube segment 43, and a diameter of the first tube segment is greater than a diameter of the second tube segment 43. The first tube segment is closer to the driving section than the second tube segment 43, and the second adjustment threaded holes 431 are provided on a tube wall of the second tube segment 43. The first tube body 41 is located within the first tube segment, an inner diameter of the first tube segment is greater than an outer diameter of the first tube body 41, and an outer end of the first tube segment is provided with a flange for fixed connection with the housing.

Understandably, the first tube segment and the second tube segment 43 are two segments of the second tube body 42 with different diameters. The first tube segment is a segment of the second tube body 42 with a larger diameter near the driving section. The second tube segment is a segment of the second tube body 42 with a smaller diameter away from the driving section. In some embodiments, lengths of the first tube segment and the second tube segment may be determined based on an actual need.

In some embodiments, the flange is provided at the outer end of the first tube segment, and first screw holes are provided at intervals along a circumference of the flange, and connecting screws are provided in the first screw holes. The housing of the driving section is provided with second screw holes and fixedly connected to the first screw holes and the second screw holes respectively through the connection screws, so that one end of the second tube body 42 is fixedly connected to the housing of the driving section, thereby realizing fixedly mounting of the output collimator on the housing of the driving section.

It is to be noted that counts and specific setting manners of the first screw holes, the second screw holes, and the connecting screws may be determined based on an actual need.

In some embodiments of the present disclosure, by designing the second tube body as the tapered tube, the second tube body is sleeved on the first tube body, realizing a coaxial arrangement of the input collimator and the output collimator, enabling coupling and transmission of light from the input fiber bundle through the input collimator and the output collimator to the output fiber bundle. Moreover, this design offers easy installation, saves structural space and production costs for the motor, and reduces vibrations caused by the rotation of the input collimator, making the motor applicable in a wider range of scenarios. In addition, by providing the flange at the one end of the second tube body and utilizing the first screw holes located on the flange, the second screw holes on the housing, and the connecting screws provided within the first screw holes, a stable fixed connection can be established between the output collimator and the housing of the driving section. This arrangement not only meets the high-speed rotational requirement of the motor but also reduces noises and vibrations during motor operation.

In some embodiments, as shown in FIGS. 1-2, another end of the driving shaft 12 is provided with a signal access connector 13, and the signal access connector 13 may be connected to an external component (e.g., a fiber optic probe, etc.) through a signal fiber bundle 14 for signal transmission between the driving section and the external component. It should be noted that a specific implementation of the signal access connector 13 may be specifically selected based on a specific type of the external component.

In some embodiments, materials used for the signal fiber bundle 14, the input fiber bundle 22, and the output fiber bundle 24 may be the same or different. For example, the material may be a fiber optic or any other fiber bundle capable of performing signal transmission.

In some embodiments, the motor with built-in optical fiber communication further includes a motor encoder, a warning module, one or more optical sensors, and a processor. The motor encoder is configured to acquire a rotational feature of the motor and obtain a motor rotational speed. The one or more optical sensors may be mounted at one or more preset point locations. The one or more optical sensors are configured to acquire energy features corresponding to the one or more preset point locations. The processor is configured to: determine a loss distribution based on energy features of the one or more preset point locations; and in response to the loss distribution satisfying a preset warning condition, perform at least one of controlling the warning module to issue a warning signal, or adjusting a rotational feature of the motor.

The motor encoder is a device that compiles and converts at least one of motor-related data or motor-related information into a signal form that may be used for communication, transmission, and storage.

In some embodiments, the motor encoder may be provided on the driving shaft 12 to ensure that the motor encoder rotates synchronously with the driving shaft 12, which can reduce transmission errors and improve a response speed and accuracy of the motor. In some embodiments, the motor encoder may also be provided in any other feasible location. For example, the motor encoder may be provided on the first tube body 41 or the second tube body 42.

In some embodiments, the motor encoder may be configured to acquire the rotational feature of the motor in real-time and transmit the rotational feature to the processor. The rotational feature refers to a feature related to the rotation of the motor. For example, the rotational feature may include a speed at which the motor is rotating (i.e., a motor rotational speed), a direction in which the motor is rotating, and a location at which the motor is rotating.

The optical sensor refers to a device that may detect and sense light and convert the light into an electrical signal. In some embodiments, each of the one or more optical sensors may be correspondingly provided at one of the one or more preset point locations in the motor with built-in optical fiber communication for acquiring the energy feature at that preset point location. Understandably, the one or more optical sensors may be configured to acquire the energy features at the one or more preset point locations. The energy feature may include an optical power acquired by the one or more optical sensors.

The preset point location refers to a pre-set point for energy feature acquisition. For example, the one or more preset point locations may include an end of the input fiber bundle 22, an end of the output fiber bundle 24, etc.

The processor may be configured to process at least one of data or information related to a motor function to perform the function described in the embodiments. In some embodiments, the processor may also include a register for storing data acquired, transmitted, or processed by the processor. For example, the processor may store to the register the energy features of the one or more preset point locations acquired by the one or more optical sensors.

It should be noted that the signal transmission between the motor encoder, the one or more optical sensors, and the processor may be realized based on a variety of ways, for example, based on wired transmission (e.g., Ethernet, cable, etc.), wireless transmission (e.g., Bluetooth, WiFi, etc.), or any other feasible transmission manners.

In some embodiments, light is lost during transmission, and a loss value may be characterized by an attenuation of the light per unit length of an optical fiber as the light is transmitted through the optical fiber. The loss value of the light directly affects a transmission distance or a distance between relay stations. In some embodiments, the processor may obtain the loss distribution based on the energy features of the one or more preset point locations through calculation. The loss distribution is used to reflect the loss of light between the one or more preset point locations. Exemplarily, one loss value may be calculated based on the energy features of two of the one or more preset point locations; a plurality of loss values may be calculated based on the energy features of each two preset point locations in a plurality of the one or more preset point locations, and the plurality of loss values may form the loss distribution.

It is to be noted that the processor may calculate the fiber loss value between the two preset point locations based on the energy features of the two preset point locations acquired by the one or more optical sensors at a certain moment. The processor may also calculate the fiber loss value between the two preset point locations based on an average value of the energy features of the two preset point locations acquired by the one or more optical sensors at a certain period of time.

In some embodiments, the loss distribution may also include a coupling efficiency. More on coupling efficiency may be found in a later description.

In some embodiments, the processor may control the warning module to issue a warning signal in response to the loss distribution satisfying the preset warning condition. In some embodiments, the processor may, in response to the loss distribution satisfying the preset warning condition, adjust the rotational feature of the motor, such as issuing a control command to adjust the motor rotational speed. Exemplarily, the processor may reduce the motor rotational speed based on a preset rule until the motor stops when the loss distribution does not satisfy the preset warning condition. The preset rule may include decreasing the motor rotational speed by one unit value each time the motor rotational speed is adjusted. The unit value may be a preset value.

The warning module refers to a module configured to alert and warn a user. In some embodiments, the warning module alerts and warns the user by issuing the warning signal. The warning signal may include a warning sound (e.g., a siren), a warning signal light (e.g., a flashing red light), a warning text, etc. In some embodiments, the user may make corresponding processing based on the warning signal, for example, adjusting the rotational feature of the motor (e.g., adjusting the motor rotational speed, etc.), disconnecting and repairing the motor, etc.

The preset warning condition refers to a warning condition that is set in advance. The preset warning condition may be set in advance based on experience. Exemplarily, if differences between a preset count of loss values in the loss distribution and standard loss values corresponding to each loss value are all greater than a mutation threshold, the loss distribution is considered to satisfy the preset warning condition. The mutation threshold may be set empirically. The standard loss value refers to a loss value of light under a normal operating condition. Understandably, the standard loss values of two different preset point locations may be different. In some embodiments, the preset count may be determined based on an actual need.

Exemplarily, the loss distribution includes ten loss values, and each of the ten loss values corresponds to a loss value between two preset point locations. If the preset count is two, for two loss values (denoted as A and B) out of the ten loss values, the loss distribution is considered to satisfy the preset warning condition if a difference between loss value A and standard loss value A' is greater than the mutation threshold, and a difference between loss value B and standard loss value B' is greater than the mutation threshold.

In some embodiments of the present disclosure, by providing the one or more optical sensors to acquire the energy features, calculating the loss of light, and judging whether to issue the warning signal and whether to adjust the motor, precise control of the motor is realized, and safe operation of the motor is ensured.

In some embodiments, the mutation threshold may be related to a service life of the optical fiber as well as a cumulative usage intensity. The cumulative usage intensity may be determined based at least on an optical power of the light transmitted in the optical fiber.

The service life of the optical fiber may be a cumulative count of hours the optical fiber has been used from a time it was put into service, up to a current moment. In some embodiments, the processor may continuously collect, update, and record the service life of the optical fiber in the register, so that the processor may obtain the service life of the optical fiber directly from the register.

The cumulative usage intensity of the optical fiber reflects cumulative optical energy of the light transmitted in the optical fiber from the time it was put into service until the current moment. In some embodiments, the cumulative usage intensity of the optical fiber may be obtained through calculation. Exemplarily, the cumulative usage intensity of the optical fiber may be calculated as $W=P_1*T_1+P_2*T_2+ \ldots +P_n*T_n$, wherein $T_1$, $T_2$, . . . , and $T_n$ are all time intervals starting from the time the optical fiber was put into service until the current moment; and $P_n$ is the optical power of the light transmitted in the optical fiber during the time interval $T_n$. In some embodiments, the time interval $T_n$ may be divided based on a preset time period, the preset time period including one day or a few days (e.g., two days, five days), one hour or a few hours (e.g., six hours, twelve hours), etc. In some embodiments, the optical power $P_n$ of the light transmitted in the optical fiber during the time interval $T_n$ may be an average value.

It should be noted that since the cumulative usage intensity is a cumulative value, only an incremental amount may be calculated at each calculation to reduce a computational effort of the processor.

In some embodiments, based on the service life and the cumulative usage intensity of the optical fiber, the processor may determine the mutation threshold in a variety of ways. For example, the processor may process the service life and the cumulative usage intensity of the optical fiber through an algorithmic model (e.g., a machine learning model, etc.) to determine the mutation threshold.

In some embodiments, the processor may also determine a set value of a recommended mutation threshold obtained by querying through a preset relationship table as the mutation threshold. The preset relationship table may be constructed based on historical data, simulation, etc. Different service lives and cumulative usage intensities of optical fibers correspond to different set values of recommended mutation thresholds. Exemplarily, the processor may utilize a specific optical fiber's service life and cumulative usage intensity to determine a mutation threshold that accurately identifies whether the optical fiber malfunctions or if the motor has an unreasonable speed setting. The processor may then assign the determined threshold as the set value of the recommended mutation threshold corresponding to the specific optical fiber's service life and cumulative usage intensity.

It is noted that the preset relationship table may be constructed by an external device (e.g., a terminal) independent of the motor, which may periodically send an updated preset relationship table to the processor, and the processor obtains the mutation threshold by receiving the updated preset relationship table and making a query.

In some embodiments, due to a potential change in the standard loss value of the optical fiber with an increasing service life of the optical fiber, determining the mutation threshold based on the optical fiber's service life and cumulative usage intensity takes into account an impact of the optical fiber's service life on the standard loss value. This comprehensive approach allows for a more reasonable determination of the mutation threshold, thus ensuring the accuracy and reliability of assessing whether the loss distribution satisfies the preset warning condition effectively.

In some embodiments, the preset count may be related to the service life and the cumulative usage intensity of the optical fiber, as well as a degree of dispersion of the loss distribution of the motor at different rotational speeds. For the preset count please refer to the previous section on satisfying the preset warning condition. The service life and the cumulative usage intensity of the optical fiber may be found in the previous description.

The degree of dispersion of the loss distribution may characterize a degree of difference between each of the loss values in the loss distribution and the corresponding standard loss value. In some embodiments, the degree of dispersion of the loss distribution of the motor at different rotational speeds may be represented by vectors, such as vectors $(S_1, S_2, \ldots, S_n)$, wherein $S_1$ is a variance of the difference between each of the loss values in the loss distribution of the motor at rotational speed $V_1$ and the corresponding standard loss value, $S_2$ is a variance of the difference between each of the loss values in the loss distribution of the motor at rotational speed $V_2$ and the corresponding standard loss value, . . . , and $S_n$ is a variance of the difference between each of the loss values and the corresponding standard loss value in the loss distribution of the motor at rotational speed $V_n$.

In some embodiments, the degree of dispersion of the loss distribution of the motor at different rotational speeds may be obtained in the following manner: at each time the motor is started, before the motor rotational speed reaches a rated rotational speed (e.g., during a motor rotational speed ramp-up process), the motor is sequentially operated at the motor rotational speeds $V_1$, $V_2$, . . . , and $V_n$ for a certain period of time, and the one or more optical sensors are utilized to acquire the energy features of the plurality of the one or more different preset point locations. Further, the variance of the difference between each of the loss values in the loss distribution of the motor at the rotational speeds $V_1$, $V_2$, . . . , and $V_n$ and the corresponding standard loss value is calculated to obtain the degree of dispersion of the loss distribution of the motor at the different rotational speeds.

In some embodiments, the longer the service life and the greater the cumulative usage intensity of the optical fiber, and the greater the variance of the dispersion of the loss distribution of the motor at the different rotational speeds, the larger the preset count may be correspondingly. In some embodiments, the preset count may have a correspondence with the service life and the cumulative usage intensity of the optical fiber, as well as the variance of the dispersion of the loss distribution of the motor at the different rotational speeds, and the correspondence may be preset empirically.

It should be noted that the variance of the degree of dispersion of the loss distribution of the motor at the different rotational speeds is not equivalent to the degree of dispersion of the loss distribution of the motor at the different rotational speeds. For example, the degree of dispersion of the loss distribution of the motor at the different rotational speeds is the vector $(S_1, S_2, . . . , S_n)$, while the variance of the degree of dispersion of the motor at the different rotational speeds is a set of variance values of $S_1$, $S_2$, . . . , and $S_n$.

In some embodiments, as the service life of the optical fiber increases, not only the standard loss value of the optical fiber may change, but a sensitivity of the loss of light may also change. Therefore, by further taking into account the dispersion of the loss distribution of the motor at the different rotational speeds, it is possible to enhance the accuracy of judging whether the loss distribution satisfies the preset warning condition, thereby improving the accuracy and reliability of the warning signal.

In some embodiments, the motor with built-in optical fiber communication further includes a communication module, the communication module being configured to communicate with the terminal.

The communication module refers to a module configured to communicate with the terminal. For example, the communication module may include fiber optics, cable, Bluetooth, and any other feasible communication manners. In some embodiments, the communication module may be provided inside the motor or integrated inside the processor to enable communication with the terminal. For example, the processor may obtain an optical fiber anomaly confidence level from the terminal.

The terminal refers to a terminal for processing at least one of data or information. For example, the terminal may include an OTC data processing center, etc. The terminal may be set independently of the motor.

In some embodiments, the processor may be further configured to: obtain the optical fiber anomaly confidence level from the terminal; and determine, based on the loss distribution and the optical fiber anomaly confidence level, at least one of the following: whether or not the warning module issues the warning signal, or, whether or not to adjust the rotational feature of the motor.

The optical fiber anomaly confidence level may reflect a reliability of an optical fiber anomaly. The optical fiber anomaly confidence level may be determined by the terminal based on an image feature of one or more generated images, the one or more generated images are images generated based on light transmitted in the optical fiber in the motor with built-in optical fiber communication, and the image feature may be obtained by the terminal by performing feature extraction on the generated images by an image recognition technique. For example, the terminal performs the feature extraction on the one or more generated images through a pre-trained image feature extraction model, e.g., a Convolutional Neural Network (CNN) model, etc., to determine the image feature of the one or more generated images. In some embodiments, the optical fiber anomaly confidence level may be obtained by determining the image feature of the one or more of the generated images through a confidence prediction model.

The confidence prediction model refers to a model used to process the image feature of the one or more generated images to determine the fiber optical fiber anomaly confidence level. In some embodiments, the confidence prediction model may be a machine learning model. For example, the confidence prediction model may be a Convolutional Neural Network (CNN) model, etc.

In some embodiments, an input of the confidence prediction model may include the image feature of the one or more of the generated images, and an output of the confidence prediction model may include the optical fiber anomaly confidence level.

In some embodiments, the confidence prediction model may be obtained by training based on a large number of labeled training samples. The training samples may include an image feature of sample generated images, and the labels may include actual optical fiber anomaly confidence levels corresponding to the image feature of the sample generated images. The training samples may be determined based on historical data and the labels may be determined based on manual labeling, etc. In some embodiments, the training samples may include positive samples and negative samples, the positive samples refer to the images generated when it has been determined that an optical fiber anomaly is present in the optical fiber, which have a label value of 1; and the negative samples refer to images generated when it has been determined that the optical fiber functions normally, which have a label value of 0.

In some embodiments, the terminal may input the training samples into an initial confidence prediction model, update the initial confidence prediction model through training iterations until a trained confidence prediction model satisfies a preset training condition, and obtain the trained confidence prediction model. The preset training condition may be that a loss function is less than a threshold, the loss function converges, or a training period reaches a threshold. In some embodiments, a manner of iteratively updating a model parameter may include a conventional model training manner such as stochastic gradient descent, etc.

In some embodiments, the processor may control the warning module to issue the warning signal when at least one of the following criteria is met: the loss distribution satisfies the preset warning condition, or the optical fiber anomaly confidence level satisfies a preset confidence threshold. In some embodiments, the processor may adjust the rotational feature of the motor when at least one of the following criteria is met: the loss distribution satisfies the preset warning condition, or the optical fiber anomaly confidence level satisfies the preset confidence threshold. The preset confidence threshold may be preset based on experience. In some embodiments, the preset confidence threshold may correlate the service life and the cumulative usage intensity of the optical fiber. For example, the preset confidence threshold is negatively correlated with the service life and the cumulative usage intensity of the optical fiber.

Manners for the processor to perform at least one of the following actions: controlling the warning module to issue the warning signal, or adjusting the rotational feature of the motor, may be found in the relevant descriptions above.

In some embodiments of the present disclosure, the optical fiber anomaly confidence level is determined by the trained confidence prediction model, which can effectively ensure the accuracy of the optical fiber anomaly confidence level, so that an optical fiber anomaly situation can be better warned.

In some embodiments, the loss distribution further includes the coupling efficiency. The coupling efficiency includes a ratio of an optical power of the input collimator to an optical power of the output collimator. In some embodiments, the processor may be further configured to, in response to determining that the loss distribution satisfies the preset warning condition, control the warning module to issue a collimator adjustment warning when at least one of the loss distribution or the optical fiber anomaly confidence level does not satisfy a preset condition after at least a preset count of motor rotational speed adjustments has been made, and based on at least one of the loss distribution or the optical fiber anomaly confidence level after the preset count of motor speed adjustments has been made, to adjust an operating parameter of at least one of the input collimator or the output collimator.

The preset count refers to a preset count of motor rotational speed adjustments. In some embodiments, the preset count may be related to the service life and the cumulative usage intensity of the optical fiber. For example, the preset count positively correlated with the service life and the cumulative usage intensity of the optical fiber.

The preset condition refers to a preset judgment condition. In some embodiments, the preset conditions may include at least one of the following criteria: the loss distribution is in a preset standard range, or the optical fiber anomaly confidence level is below the preset confidence threshold. The preset standard range may be a range value set based on experience.

The collimator adjustment warning refers to a warning signal related to making adjustments to a collimator. In some embodiments, the collimator adjustment warning may be generated and issued through the warning module.

The operational parameter refers to a parameter related to an operation of the collimator (e.g., the input collimator and the output collimator). In some embodiments, the operational parameter of the collimator may include a degree of coaxiality of the input collimator and the output collimator, a degree of parallelism of end faces of the input collimator and the output collimator, a distance between the input collimator and the output collimator, etc.

In some embodiments, a unit adjustment amount may be preset, and the unit adjustment amount refers to a single adjustment amount for the operating parameter. The processor may adjust the operating parameter of at least one of the input collimator or the output collimator based on the unit adjustment amount, and after each adjustment, evaluate whether at least one of the loss distribution or the optical fiber anomaly confidence level satisfies the preset condition, until both the loss distribution and the optical fiber anomaly confidence level satisfy the preset condition, then stop the adjustment.

In some embodiments of the present disclosure, adjusting the operating parameter of the collimator can ensure a collimation effect of the collimator to a certain extent and improve an efficiency of optical fiber communication.

The basic concepts have been described above, and it will be apparent to those skilled in the art that the foregoing detailed disclosure is intended as an example only and does not constitute a limitation of the present disclosure. Although not expressly stated herein, a person skilled in the art may make various modifications, improvements, and amendments to the present disclosure. Such modifications, improvements, and amendments are suggested in the present disclosure, so such modifications, improvements, and amendments remain within the spirit and scope of the exemplary embodiments of the present disclosure.

Also, the present disclosure uses specific words to describe the embodiments of the present disclosure. For example, "an embodiment", "one embodiment", and/or "some embodiments" means a feature, structure, or characteristic related to at least one embodiment of the present disclosure. Accordingly, it should be emphasized and noted that "an embodiment", "one embodiment" or "an alternative embodiment" referred to two or more times in different places in the present disclosure do not necessarily refer to the same embodiment. In addition, certain features, structures, or characteristics of one or more embodiments of the present disclosure may be suitably combined.

Similarly, it should be noted that in order to simplify the presentation of the present disclosure, and thereby aid in the understanding of one or more embodiments, the preceding description of embodiments of the present disclosure sometimes incorporates a variety of features into a single embodiment, accompanying drawings, or description thereof. However, this manner of disclosure does not imply that the subject matter of the present disclosure requires more features than those mentioned in the claims. Rather, claimed subject matter may lie in less than all features of a single foregoing disclosed embodiment.

Some embodiments use numbers to describe the number of components, and attributes, and it should be understood that such numbers used in the description of the embodiments are modified in some examples by the modifiers "about", "approximately", or "generally". Unless otherwise stated, "about", "approximately" or "generally" indicates that a variation of ±20% is permitted. Accordingly, in some embodiments, the numerical parameters used in the present disclosure and claims are approximations, which may change depending on the desired characteristics of the individual embodiment. In some embodiments, the numeric parameters should be considered with the specified significant figures and be rounded to a general number of decimal places. Although the numerical domains and parameters used to confirm the breadth of their ranges in some embodiments of the present disclosure are approximations, in specific embodiments such values are set as precisely as possible within the feasible range.

With respect to each patent, patent application, patent application disclosure, and other material, such as articles, books, manuals, publications, documents, etc., cited in the present disclosure, the entire contents thereof are hereby incorporated herein by reference. Application history documents that are inconsistent with or conflict with the contents of the present disclosure are excluded, as are documents (currently or hereafter appended to the present disclosure) that limit the broadest scope of the claims of the present disclosure. It should be noted that in the event of any inconsistency or conflict between the descriptions, definitions, and/or use of terminology in the materials appended to the present disclosure and those described in the present disclosure, the descriptions, definitions, and/or use of terminology in the present disclosure shall prevail.

Finally, it should be understood that the embodiments described in the present disclosure are intended only to illustrate the principles of the embodiments of the present disclosure. Other deformations may also fall within the scope of the present disclosure. Thus, by way of example and not limitation, alternative configurations of embodiments of the present disclosure may be considered consistent with the teachings of the present disclosure. Accordingly, the embodiments of the present disclosure are not limited to the embodiments expressly presented and described herein.

What is claimed is:

1. A motor with built-in optical fiber communication, comprising a slip ring section and a driving section, wherein the driving section has a rotationally mounted driving shaft, the slip ring section has a stator unit and a rotor unit, and the driving shaft and the rotor unit are arranged along a centerline of the driving shaft and are fixedly connected, the driving shaft has a channel passing through a shaft body, the rotor unit includes an input collimator, the channel is configured to accommodate an input fiber bundle connected to the input collimator, and the driving shaft and the input collimator are fixedly connected through a first connecting component, the first connecting component includes a first tube body, one end of the first tube body is fixedly connected to one end of the driving shaft, and the input collimator is mounted at another end of the first tube body, the another end of the first tube body is provided with a first adjustment component configured to adjust an attitude of a centerline of the input collimator.

2. The motor of claim 1, wherein the stator unit includes an output collimator, the driving section further includes a housing, and the output collimator is fixedly mounted on the housing through a second connecting component.

3. The motor of claim 2, wherein the second connecting component includes a second tube body, the second tube body is sleeved on the first tube body, one end of the second tube body is fixedly connected to the housing, and the output collimator is mounted within another end of the second tube body.

4. The motor of claim 3, wherein the another end of the second tube body is provided with a second adjustment component configured to adjust an attitude of a centerline of the output collimator.

5. The motor of claim 1, wherein the driving section is composed of a hollow motor.

6. The motor of claim 1, wherein the first adjustment component includes first adjustment threaded holes, the first adjustment threaded holes are provided on a tube wall at the another end of the first tube body and are spaced apart along a circumference of the first tube body, and the first adjustment threaded holes are provided with first adjustment screws configured to adjust the attitude of the centerline of the input collimator and fix the input collimator.

7. The motor of claim 4, wherein the second adjustment component includes second adjustment threaded holes, the second adjustment threaded holes are provided on a tube wall at the another end of the second tube body and are spaced apart along a circumference of the second tube body, and the second adjustment threaded holes are provided with second adjustment screws configured to adjust the attitude of the centerline of the output collimator and fix the output collimator.

8. The motor of claim 6, wherein a mounting hole is provided on a tube wall at the one end of the first tube body, a mounting screw is provided in the mounting hole, the one end of the driving shaft is inserted into the first tube body, and the one end of the driving shaft and the first tube body are fixedly connected through the mounting hole and the mounting screw.

9. The motor of claim 7, wherein the second tube body is a tapered tube, including a first tube segment and a second tube segment, a diameter of the first tube segment is greater than a diameter of the second tube segment, the first tube segment is closer to the driving section than the second tube segment, the second adjustment threaded hole is provided on a tube wall of the second tube segment; and the first tube body is located within the first tube segment, an inner diameter of the first tube segment is greater than an outer diameter of the first tube body, and an outer end of the first tube segment is provided with a flange for fixed connection with the housing.

10. The motor of claim 7, wherein another end of the driving shaft is provided with a signal access connector.

11. The motor of claim 10, wherein the input collimator includes an input tube body and an input collimator main body located within the input tube body, the output collimator includes an output tube body and an output collimator main body located within the output tube body; and the input tube body and the output tube body are metallic tube bodies, the first adjustment screw and the second adjustment screw respectively abut and adjust to fix the input tube body and the output tube body, an inner diameter of the first tube body is greater than an outer diameter of the input tube body, and an inner diameter of the second tube body is greater than an outer diameter of the output tube body.

12. The motor of claim 11, wherein the input fiber bundle is fixed within the channel through gluing, the input collimator main body is fixedly connected to the input tube body through gluing, and the output collimator main body is fixedly connected to the output tube body through gluing.

* * * * *